W. WATSON.
RAKE CLEANER.
APPLICATION FILED JULY 3, 1915.
1,156,729.
Patented Oct. 12, 1915.
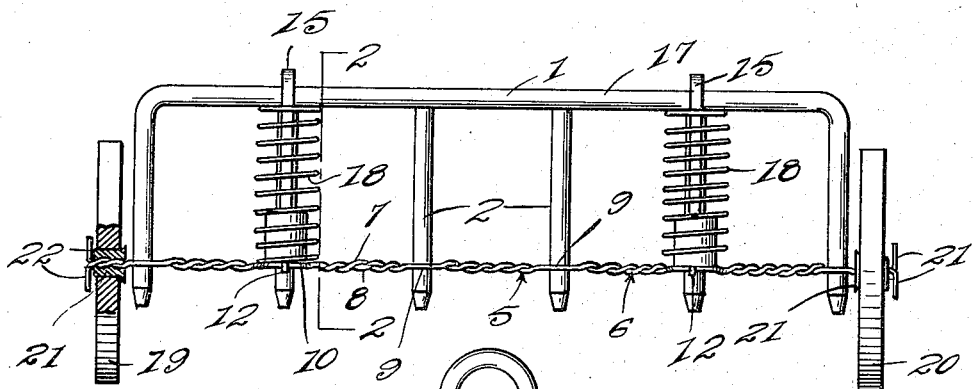
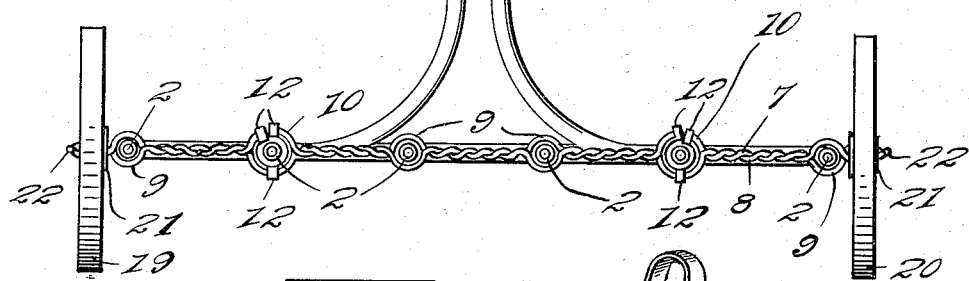
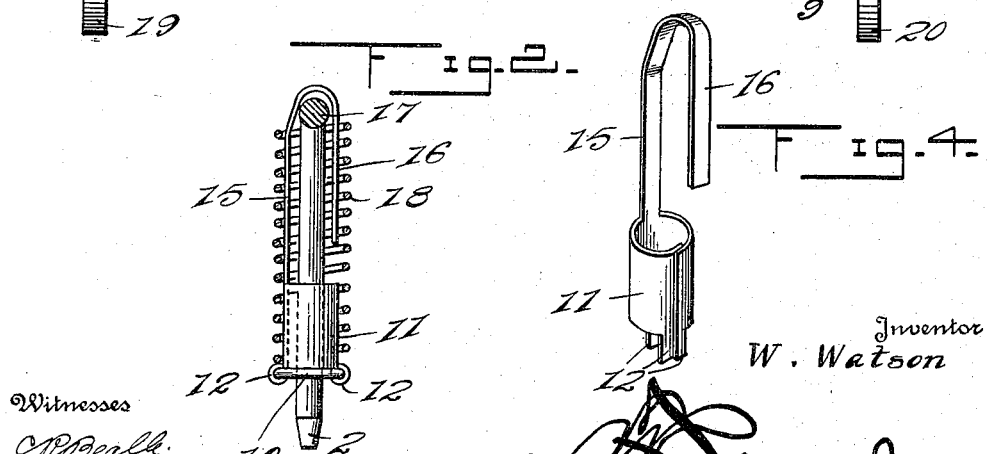
Witnesses
C. R. Beall.
A. L. Birum
Inventor
W. Watson
By
Attorney

UNITED STATES PATENT OFFICE.

WILLIAM WATSON, OF BENTON, ILLINOIS.

RAKE-CLEANER.

1,156,729.  Specification of Letters Patent.  Patented Oct. 12, 1915.

Application filed July 3, 1915. Serial No. 38,019.

*To all whom it may concern:*

Be it known that I, WILLIAM WATSON, a subject of the King of Great Britain, residing at Benton, in the county of Franklin and State of Illinois, have invented certain new and useful Improvements in Rake-Cleaners; and I do hereby declare the following to be a full, clear, and exact description of the invention, such as will enable others skilled in the art to which it appertains to make and use the same.

This invention relates to a cleaning attachment for rakes, and the primary object of the invention is to provide a rake cleaner, or a device applicable for attachment to any desired type of rake commonly in use, which will automatically clean the raking teeth or tines of the rake when the same is moved out of a raking position.

Another object of this invention is to provide a rake cleaner as specified, which includes a bar composed of a pair of twisted wires having portions of their length spaced for encompassing the rake teeth, and to mount wheels upon the outer ends of the wires exteriorly of the outermost teeth of the rake which will roll upon the ground and permit the wires to force the leaves or like foreign articles from the teeth or tines of the rake, and further to provide means for yieldably supporting the wires, so that when a downward pressure is applied to the rake head, the bar which is composed of the wires, will move upwardly along the teeth toward the connecting head of the rake.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is an end view of a rake, showing the improved cleaner attached thereto, Fig. 2 is a cross sectional view on the line 2—2 of Fig. 1, Fig. 3 is a bottom plan view of the rake, and Fig. 4 is a detail perspective view of a part of the construction of the cleaner.

Referring more particularly to the drawings, 1 designates a rake head of any ordinary construction, which is provided with a plurality of raking teeth or tines 2.

The rake cleaner, which constitutes this invention, is designated as an entirety, by the numeral 5. The rake cleaner 5 includes a bar 6, which is composed of strands 7 and 8 of wire, which are twisted about each other, as is clearly shown in Figs. 1 and 3 of the drawings, for forming the bar 6. Portions of the lengths of the strands of wire 7 and 8 are free from twisted connection with each other, and bowed outwardly, as is shown at 9 in Fig. 3 of the drawing. The substantially circular portions formed by the bowed out portions 9 of the strands 7 and 8 of wire, encompass the raking teeth or tines 2 of the rake and they are slidably mounted thereon. The bowed portions 10, which are positioned next to the outermost bowed portions of the wires, extend about the lower ends of sleeves 11, which sleeves have longitudinally extending tongues 12 formed upon their lower ends. The tongues 12 are rolled upwardly about the bowed portions of the strands of wire for connecting the strands of wire, and consequently the bar 6 which is formed of the twisted strands, to the sleeves 11.

The sleeves 11 have tongues 15 secured to their ends oppositely from the tongues 12. The tongues 15 are relatively long, with respect to the sleeves and the tongues 12, and they extend upwardly therefrom, having their upper ends bent to form a hook, indicated at 16, which hook is provided for extending over the base 17 of the rake head 1. Spiral springs 18 are coiled about the sleeves 11 and the tongues 15. The spiral springs 18 engage the bar 6 and the under surface of the base 17 of the rake head, and tend to hold the bar 6 downwardly upon the tines 2. The strands 7 and 8 of wire extend beyond the outermost tines or teeth of the rake head and have wheels 19 and 20 rotatably mounted thereon. If it is so desired, bushings, indicated at 21, may be mounted about the outer ends of the wires for providing a more efficient bearing upon which the wheels 19 and 20 may rotate. The terminals of the strands 7 and 8 of wire are bent transversely to the main portions of the wires, as is shown at 22, forming keys for preventing the wheels 19 and 20 from moving laterally off the strands.

When it is desired to use the rake, pressure applied to the rake for efficiently raking the leaves, will compress the springs 18, and consequently force the bar 6 upwardly along the teeth 2, owing to the fact that the peripheries of the wheels 19 and 20 will rest upon the ground, and be even with the lower ends of the tines or teeth of the rake. When the rake is lifted from the ground, the springs 18 will automatically force the bar 6 downwardly to the position illustrated in Fig. 1 of the drawings, and clean the rake, removing leaves or the like which might have clung to the tines or teeth 2.

In reducing the invention to practice, certain minor features of construction, combination, and arrangement of parts may necessitate alteration, to which the patentee is entitled, provided such alterations are comprehended within the scope of what is claimed.

What is claimed is:—

1. In a rake cleaner, the combination, of a rake head of ordinary construction including a base and a plurality of raking teeth, of a bar provided with rake teeth receiving portions, a pair of wheels rotatably mounted upon the outer ends of said bar and outwardly of the outermost of the rake teeth, and means for yieldingly connecting said bar to the base of said rake head.

2. In a rake cleaner, the combination, of a bar having a plurality of rake teeth receiving portions, a pair of wheels rotatably mounted upon the outer ends of said bar, sleeves connected to said bar, tongues formed upon said sleeves and extending upwardly therefrom, said tongues having their upper ends bent to form hooks for extending over the base of said rake head, and springs coiled about said sleeves and said tongues for yieldably connecting said bar to said rake head.

3. In a rake cleaner, the combination, of a rake head of ordinary construction including a base and a plurality of raking teeth, a pair of strands of wires twisted for forming a bar, portions of said strands of wire being free from twisted connection and bowed outwardly for forming receiving portions for said rake teeth, wheels mounted upon the outer ends of said strands of wire outwardly of the outermost teeth of said rake head, the ends of said strands of wire being bent transversely to the strands for locking said wheels upon said strands, and means for yieldably connecting said bar to the base of said rake head.

In testimony whereof I affix my signature in presence of two witnesses.

WILLIAM WATSON.

Witnesses:
M. J. CARRAHER, Jr.,
JAMES TOWAL.

Copies of this patent may be obtained for five cents each, by addressing the "Commissioner of Patents, Washington, D. C."